United States Patent
Ali

(10) Patent No.: US 9,852,369 B2
(45) Date of Patent: Dec. 26, 2017

(54) ELECTRONIC ENTITY HAVING AN RFID TRANSPONDER

(71) Applicant: OBERTHUR TECHNOLOGIES, Colombes (FR)

(72) Inventor: Ahmed Ali, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 15/326,327

(22) PCT Filed: Jul. 13, 2015

(86) PCT No.: PCT/FR2015/051932
§ 371 (c)(1),
(2) Date: Apr. 21, 2017

(87) PCT Pub. No.: WO2016/009142
PCT Pub. Date: Jan. 21, 2016

(65) Prior Publication Data
US 2017/0249544 A1    Aug. 31, 2017

(30) Foreign Application Priority Data
Jul. 16, 2014  (FR) ...................................... 14 56831

(51) Int. Cl.
*G06K 19/07*  (2006.01)
*H01Q 1/22*  (2006.01)
(Continued)

(52) U.S. Cl.
CPC ... *G06K 19/0726* (2013.01); *G06K 19/07783* (2013.01); *G06K 19/07784* (2013.01);
(Continued)

(58) Field of Classification Search
None
See application file for complete search history.

(56) References Cited

U.S. PATENT DOCUMENTS 5,248,989 A    9/1993  Murdoch
6,127,989 A   10/2000  Kunz
(Continued)

FOREIGN PATENT DOCUMENTS

EP    2 296 226 A1    3/2011
EP    2 410 470 A1    1/2012
(Continued)

OTHER PUBLICATIONS

International Search Report, dated Nov. 2, 2015, from corresponding PCT Application.

*Primary Examiner* — Kristy A Haupt
(74) *Attorney, Agent, or Firm* — Young & Thompson

(57) ABSTRACT

Disclosed is an electronic entity having a transponder which includes a body provided with a recess and, inside the recess, a transponder including a mounting supporting an antenna formed by at least one turn running along the contour of the module and a microcircuit, the antenna and microcircuit being connected to one another, plates of conductive material being formed on each of the surfaces facing one another, covering 60-90% of the surface defined by the one or more turns of the antenna, forming a capacitor connected in parallel on the antenna, and the body including an annular metal area, the inner contour of which projects into the plane of the mounting surrounds the mounting and is suitable for concentrating the field lines toward the inside of the turn, the capacitor defining, with the antenna and the microcircuit, a given resonance frequency substantially equal to the frequency of an external reader.

20 Claims, 3 Drawing Sheets

(51) Int. Cl.
    *H01Q 1/38*     (2006.01)
    *H01Q 7/04*     (2006.01)
    *G06K 19/077*     (2006.01)

(52) U.S. Cl.
    CPC ............ *H01Q 1/2225* (2013.01); *H01Q 1/38* (2013.01); *H01Q 7/04* (2013.01)

(56) References Cited

U.S. PATENT DOCUMENTS

| | | |
|---|---|---|
| 6,522,308 B1 | 2/2003 | Mathieu |
| 2005/0186902 A1 | 8/2005 | Lieffort et al. |
| 2007/0164866 A1 | 7/2007 | Robin et al. |
| 2012/0018522 A1 | 1/2012 | Le Garrec et al. |

FOREIGN PATENT DOCUMENTS

| | | |
|---|---|---|
| FR | 2 863 748 A1 | 6/2005 |
| FR | 2 908 207 A1 | 5/2008 |
| WO | 01/50547 A1 | 7/2001 |
| WO | 02/50547 A2 | 6/2002 |

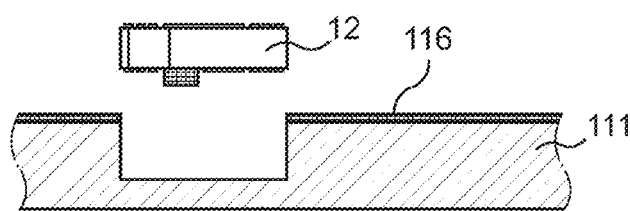
Fig. 5A
Fig. 5B
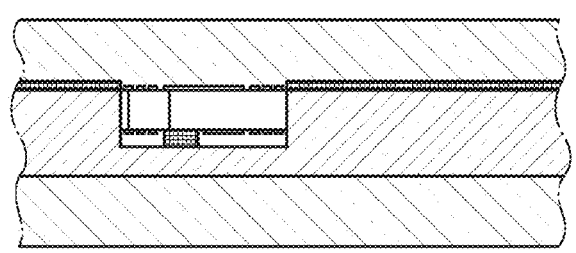
Fig. 5C
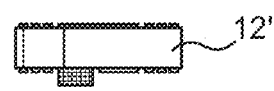
Fig. 6A
Fig. 6B
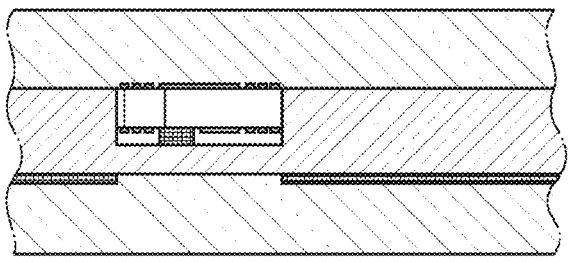
Fig. 6C

ELECTRONIC ENTITY HAVING AN RFID TRANSPONDER

The invention relates to an electronic entity having a radiofrequency identification transponder with a miniature radiating element, the gain of which is enhanced. A radiofrequency identification transponder is conventionally denoted by the acronym RFID. Both terms will be used below. The term RFID label, or module, is also used when the transponder is limited to a very flat object. The use of the term module or label refers more to the form of the transponder rather than to its function.

An RFID transponder mainly comprises a radiofrequency (RF) microcircuit and an antenna. The RF microcircuit (also referred to as the RF chip) and the antenna together form a resonant circuit. More specifically, the input parasitic impedance of the RF circuit is conventionally likened to the combination of a resistor and a capacitor, connected in parallel, while the antenna is conventionally likened to the combination of an inductor and a resistor which are connected in parallel with a capacitor. The obtained resonant circuit is capable of exchanging information with an external station, by reacting to an electromagnetic field emitted by the latter at the same resonance frequency; in practice, the resonant circuit uses the antenna to draw the power it needs from the electromagnetic field emitted by such a station.

The resonance frequency of such a circuit may be calculated by means of the following formula:

$$F_r \cong \frac{1}{2\pi\sqrt{L_a(C_a + C_{chip})}} \quad \text{Eqn. (1)}$$

Where:
$L_a$ is the inductance of the antenna;
$C_a$ is the capacitance of the antenna;
$C_{chip}$ is the input parasitic capacitance of the radiofrequency circuit.

In fact, the capacitance of the RF circuit depends on the activation power delivered by the antenna to this circuit; in practice this entails a first value of Fr for a low power level referred to as OFF (in which case, typically, the resonant circuit is exposed to a power level of −30 dBm) and another value of Fr for a higher power level referred to as ON (in which case, typically, the resonant circuit is exposed to a power level of 10 dBm); specifically, the capacitance of the RF circuit increases with the excitation power. The frequency in the ON state is typically lower than the frequency in the OFF state.

In order to match an antenna to a particular RF circuit, the value of the input capacitance of this circuit, typically in the OFF state, is initially used and, on the basis of the equation Eqn (1) given above, the values to be associated with the antenna in order to satisfy the resonance condition are deduced therefrom; for an antenna having a given number of turns and a given geometry, the capacitance of the antenna may be adjusted by varying the spacing between the turns of the antenna or the diameter of the wires (in the case of an antenna formed from wires embedded in the carrier), or by varying the thickness, the height and the spacing of the turns (in the case of an antenna formed by means of etching and screen printing). The inductance of the antenna results from the geometry of the antenna, the constituent material of the turns and the number of turns.

It is understood that the design of an RFID transponder antenna must comply with two constraints.

On the one hand it must be correctly tuned to the resonance frequency recommended by the manufacturer of the RF circuit (referred to as the "foundry"), determined on the basis of the frequency at which the transponder communicates with the external reader (for example 13.56 MHz as specified in the standard ISO 14443, which may be obtained by means of an appropriate number of turns, by means of an appropriate turn structure (using wires, or by means of screen printing) and the spacing between turns; these parameters determining the quantities $L_a$ and $C_a$ of the antenna in the schematization discussed above. However, it may be easier to add an additional capacitance to the antenna formed in such a manner, subject to being able to form it with the correct value.

On the other hand, the antenna must deliver enough power within the ambient electromagnetic field to supply power to the RF circuit, at the resonance frequency. The power picked up by an antenna depends on the amplitude of the electromagnetic field and the cross section of the antenna, i.e. the area through which the lines of this electromagnetic field pass; stated otherwise, the power picked up by the antenna depends on the area, delimited by the turns, through which the lines of the field broadcast by the external RFID station can pass, thus defining the flux of the electromagnetic field through the antenna. However, with the trend to miniaturize RFID transponders, increasingly smaller antennas are having to be implemented; by way of example, antennas with areas representing a quarter, or even a fifth (or even less), of that of a card of standardized ID-1 format (according to the standard ISO/IEC 7816, the ID-1 format specifies a generally rectangular shape of 54 mm×85.6 mm), and obtaining the required power becomes a critical issue, in particular because of certain protocols that demand multiple exchanges between the station and the RFID transponders, for example cryptography protocols for security applications.

An object of the invention is to meet the two aforementioned objectives, in particular in a context of large-scale and low-cost production (which entails a high level of simplicity of design and implementation).

It is recalled that, in the past, electronic entities in ID-1 format have been known that comprise a body comprising a cavity housing a module, more specifically a transponder, bearing a microcircuit, this circuit being connected to an antenna, the turns of which follow the periphery of the body; in order to minimize the connection problems linked to the fact that the circuit is borne by a module while the antenna is formed in a body that is initially independent of this module, it has been necessary to take great care when positioning the module within the cavity of the body (the electrical connection of the circuit to the antenna is formed at the moment at which the module is set into the cavity of the body); in order to decrease manufacturing constraints, the trend since then has been to want to form the antenna and the RF circuit on one and the same carrier, which means limiting the cross section of the antenna to the area of the module bearing the RF circuit.

To this end, the invention proposes an electronic entity comprising a transponder, which entity is intended to communicate with an external reader at a first determined frequency and comprises a body provided with a cavity and, in this cavity, a transponder comprising a carrier having a plane and bearing, connected to one another, an antenna formed from at least one turn following the contour of this carrier and a microcircuit, plates made of a conductive material being formed on each of the sides of the carrier facing one another so as to form a capacitor connected in parallel with the antenna, and the body comprising, at least approximately at the level of this cavity, an annular metal zone having an inner contour, the projection of which into the plane of the carrier surrounds said carrier and which is capable of concentrating field lines toward the interior of the turn, the capacitor defining, with the antenna and the microcircuit, a resonant circuit resonating at a second frequency that is substantially equal to the first frequency, these plates of the capacitor covering 60% to 90% of the surface delimited by the one or more turns of the antenna.

The term "projection" is understood to mean the orthogonal projection in a direction that is perpendicular to the plane along which the carrier extends.

Thus, the invention teaches the positioning of the metal zones substantially at the level of the transponder (i.e. substantially in the same plane) both on the inside and on the outside of the turns of the antenna and in proximity thereto. The area of the metal zone surrounding the cavity containing the transponder is advantageously at least equal to that of the carrier (or even at least three times this area), which is a quantity guaranteeing that the presence of the metal zone surrounding the antenna has a meaningful effect in terms of concentrating the flux lines toward the interior of the antenna.

However, it was generally known that the presence of a metal plate facing an antenna had the effect of severely disrupting any exchange of data between an external data exchange station and this antenna; the addition of such a metal plate has even been proposed as a means of passively protecting, by jamming, an antenna in order to prevent an undesired exchange of data between a circuit connected to this antenna and an external station (see in particular the document FR-2 863 748).

The document EP-2 410 470 had already proposed, regarding a circuit comprising an antenna and a circuit, the insertion of an element for amplifying the gain, i.e. the performance, of the antenna, comprising an annular electrically conductive zone that is electrically isolated from the circuit and positioned around a region of the body formed from a volume created by the geometric projection of the area of the antenna in a direction that is substantially orthogonal to said area. In this document it is mentioned, unlike in the document U.S. Pat. No. 5,248,989, that such a continuous electrically conductive zone surrounding the portion of the body bearing the antenna has a positive concentrating effect on the signal.

Furthermore, it was already known practice, in accordance with the document WO-01/50547 (or its equivalent U.S. Pat. No. 6,522,308), to form a capacitor inside the volume of an antenna borne by a carrier. More specifically, this document teaches the formation (in practice by means of screen printing), on one side of a substrate, of an antenna and a capacitor that is located inside the volume delimited by the antenna and connected in parallel therewith (such a capacitor is formed from two metal zones separated by a dielectric layer, these three zones being formed by means of screen printing on the side of the carrier bearing the antenna). This allows a capacitance matching the circuit to the antenna to be formed, adding to the intrinsic capacitance of the RF circuit and of the antenna in order to satisfy the resonance condition.

It is nonetheless understood that those skilled in the art had every reason to believe that it was due to special conditions that a positive effect from such metal zones, whether outside or inside the turns of an antenna, could be observed, contrary to the generally negative effect of a metal zone positioned facing an antenna. Those skilled in the art therefore had every reason to assume that any variation in the distribution of the metal zones in the direction of the known configuration of a metal zone positioned facing the antenna would dispel the positive effects in exchange for the jamming effect of a metal zone.

Surprisingly however, it has been observed that combining metal zones outside the turns of the antenna with metal zones inside these turns could allow the positive effects of each of these types of metal zones to be combined, even though the combination of such metal zones entails the formation of an almost continuous metal layer (except facing the turns of the antenna and potential slits, which are very limited in number (typically one or two), within the annular metal zone), which it was believed would assuredly have the negative effect of a continuous layer forming a mask.

It should be noted that the combination of the invention is not limited to the juxtaposition of teachings taken from the aforementioned documents since, in particular, the invention teaches the positioning of two metal zones on the opposite sides of the carrier of the module bearing the antenna and the RF circuit (while in the document WO-02/50547 the two plates of the capacitor are formed on one and the same side of the carrier), which in particular entails the formation of a metal zone on the side of this carrier to which the microcircuit forming the RF circuit is fixed.

It may be noted that the capacitor allows the overall capacitance of the antenna to be adjusted so as to tune the transponder to the correct frequency, without however decreasing the amount of flux received by the turns.

The aforementioned amount of 60% to 90% of the area delimited by the one or more turns, accounting for the usual thicknesses of label or transponder carriers, is entirely compatible with the frequency conditions of the invention; it is worth noting that the footprint of the circuit may represent only a few percent of this area, which makes it possible to obtain plates that cover such a fraction of the area surrounded by the antenna while having simple, for example rectangular, geometric forms.

Advantageously, the area of the metal zone surrounding, either continuously or discontinuously, the carrier is at least triple that of the carrier, which is a threshold entailing, as a general rule, a very substantial concentration effect of the invention; in practice, it is advantageous that the body bearing the transponder is covered by the outer metal zone over at least 80% of its area, which makes optimum use of the presence of the body of the electronic entity. However, it becomes preferable not to form this metal zone beyond a multiple of 20 times the area of the transponder; beyond such a threshold, the cost of forming the metal zone is no longer compensated for by a meaningful increase in the concentration of the flux lines inside the antenna.

The annular zone may be discontinuous in the sense that it may have one (or even two, but not many more) slit therein extending from the inner contour to the outer contour.

The annular zone is made from an electrically conductive material that is impermeable to the electromagnetic field of the external reader, i.e. a material that could be used to produce a metal electromagnetic shield in order to decrease the electromagnetic field received from the reader in the vicinity of an object to be insulated. Given that the effectiveness of such a shield depends on the material, on its thickness and on the frequency to be blocked, there exists a plethora of possibilities for producing the annular zone. This zone is made of metal, as this is commonly used for shielding.

The metal zone surrounding the cavity may be solid, like the metal zones forming the capacitor (which explains why the metal zones inside the antenna are called "plates"); however, it is advantageous for this metal zone outside the cavity to be apertured, for example formed from a grating, the holes being substantially smaller than the wavelength of the radiation emitted by the external reader. Such a grating may be formed from deposited wires, or from a grid formed by means of screen printing (using a conductive ink); it may be a grating with a square or rectangular mesh, or a hexagonal grid, in particular. In practice, it may be specified that, within such an apertured plate, the non-metalized spaces are advantageously distanced from the adjacent non-metalized spaces by between 1.5 and five times the width of the metalized strips separating them.

The antenna comprises at least one turn, on one of the sides of the carrier; preferably however, it comprises at least one turn on each of the faces, thereby allowing the best use to be made of the available area on the carrier next to its contour and therefore optimizing the power picked up from the ambient electromagnetic radiation; the number of turns on each of the sides of the carrier is advantageously between two and five, which amounts to the occupation of only a modest fraction of the area of the carrier next to its contour, typically between 5 and 10% of this area.

Preferably, the distance of these plates forming the capacitor from the antenna is greater than twice the width of this turn, which leaves enough space for the passage of the flux lines. When there are multiple turns on one side, it is recommended for the inter-turn spacing between the turns of the antenna to be smaller than the distance between the edge of the the metal electrode of the capacitor plate and the edge of the inner turn forming the windings of the antenna. It is advantageous for the corresponding plate of the capacitor to be located away from the innermost turn by a distance that is at least equal to 150% of the spacing of the turns (i.e. the space between two turns). This helps to guarantee that the flux lines, i.e. the magnetic field lines passing through an area, pass through the transponder inside the antenna and not outside due to reflection. Moreover, this allows the occurrence of parasitic capacitance due to the proximity of the metal electrode and the innermost turn to be avoided.

Depending on the case, it may be advantageous for the distance between the inner contour of the annular metal zone and the outermost turn of the antenna to be smaller than, equal to or, conversely, greater than the distance between the plates of the capacitor and the innermost of this antenna.

It is understood that the invention is most particularly advantageous when the transponder is small in size, i.e. at most equal to a quarter, or even a fifth, of the standardized ID-1 format in size.

The electronic entity is advantageously a data storage card, such as a bank card, or a form of identification, such as a badge or a passport in particular.

Advantageously, such a passport comprises an electronic entity according to at least one of the above features, the body of which has at most the dimensions of a page of said passport while being assembled with such a page. A passport usually comprises a cover page, a flyleaf, one or more pages made of a plastic material and one or more pages made of paper; preferably, the page containing the electronic entity may be chosen from among the cover page, the flyleaf or a page made of plastic.

Objects, features and advantages of the invention will become clear from the following description, which is given by way of non-limiting illustration and with regard to the appended drawing in which:

FIGS. 5A to 5C show three successive steps in the formation of an electronic entity having a transponder according to the invention, such as a passport; and FIGS. 6A to 6C show three successive steps in the formation of an electronic entity having a transponder according to the invention, according to a variant of FIGS. 5A to 5C.

Figure 1:
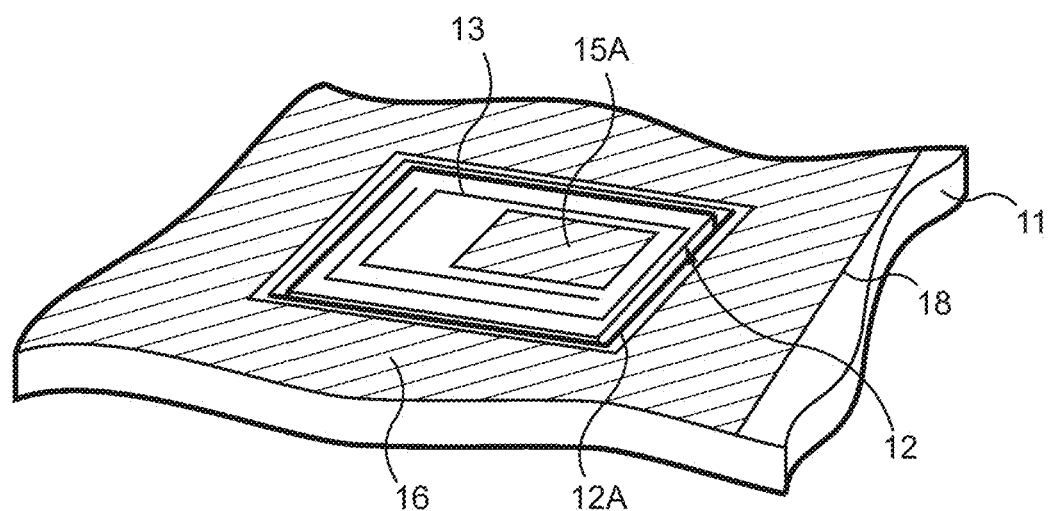
FIG. 1 is a partial schematic view of an electronic entity having a transponder according to the invention.

FIG. 1 schematically shows an electronic entity having an RFID transponder according to the invention, denoted by 10 in its entirety. It is capable of communicating with at least one external reader at a first determined frequency.

The outer contour of this electronic entity having a transponder is not shown; this electronic entity having a transponder may in particular be integrated into a tag borne by an article for which there is a desire to follow the movements, a data storage card such as a bank card, or a security document, such as a document proving an identity, for example a passport.

Figure 4:
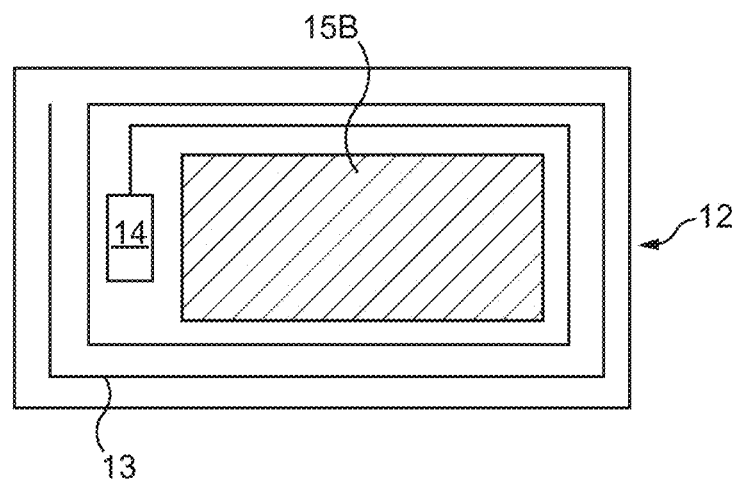
FIG. 4 is a view of the side of the transponder bearing the circuit.

This electronic entity comprises a body 11 in which a cavity is made, in which a module 12 is housed comprising, borne by one and the same carrier 12A and connected to one another, an antenna 13 formed from at least one turn and one RF circuit (also referred to as a microcircuit), which is not shown in this FIG. 1 but appears in FIG. 4 with the reference 14; owing to the presence of the antenna the module constitutes an RFID transponder.

Preferably, the antenna comprises at least one turn on the side opposite that which bears the microcircuit; advantageously, it comprises at least one turn on each of the sides of the carrier, thereby helping to maximize the ability to pick up electromagnetic energy from the environment.

The antenna follows the outer contour of the carrier, i.e. the outermost turn comprised by the antenna on the (or each) side of the carrier is located a small distance away from this contour, typically less than 10 times the width of this turn.

A number of turns of between two and five on each side of the carrier advantageously constitutes a good compromise between the amount of power picked up from the environment and the footprint of the antenna on the sides of the carrier. In practice this corresponds to a footprint of between 5% and 10% of the area of the side in question of the carrier.

The body 11 comprises, surrounding the cavity and in proximity thereto, here on its surface, an annular zone 16 made of an electrically conductive material (typically of a metal) which is isolated with respect to the module 12. The annular metal zone is delimited on the inside by an inner contour positioned such that its projection into the plane of the carrier surrounds said carrier. In the example shown, the annular zone completely surrounds the carrier but, in a variant, a very small number of slits (typically a single slit) may pass therethrough, extending from the inner contour up to the outer contour.

The module comprises, inside the turns of the antenna 13, a metal plate 15A forming part of a capacitor connected in parallel with this antenna. The upper side of the carrier 12A is here substantially at the same level as the side of the body 11 which bears the metal zone 16, such that the plate 15A is here substantially at the same level as this metal zone 16. According to one variant embodiment, the carrier is fixed onto an opposite side of the body such that the carrier and the metal zone extend along separate, but very close, planes, of the order of the thickness of the body of the electronic entity. The carrier 12A bears, on its opposite side (oriented toward the bottom of the cavity), the microcircuit 14 (which explains why it is not visible) and a second metal plate 15B (see FIG. 3) located facing, through the carrier, the first metal plate 15A so as to form said capacitor.

This capacitor defines, along with the antenna and the microcircuit, a resonant circuit resonating at a frequency that is substantially equal to the determined frequency of the external reader.

Figure 2:
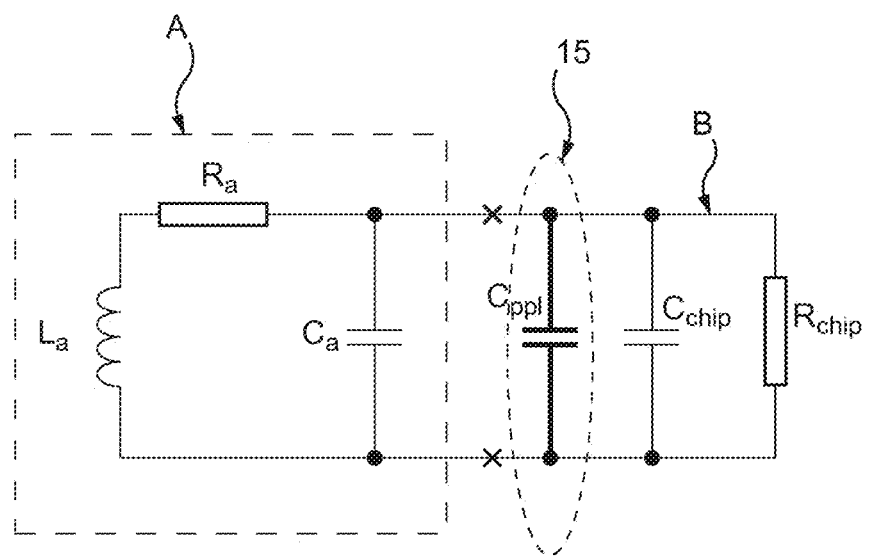
FIG. 2 is a circuit diagram of the transponder.

The equivalent circuit diagram for the transponder is shown in FIG. 2. The diagram shows the inductance $L_a$ and the capacitance $C_a$ of the antenna (in a box A), the capacitance $C_{chip}$ and the resistance $R_{chip}$ of the microcircuit (in a box B) and an additional capacitance, denoted by $C_{ppl}$, corresponding to the capacitor 15 formed by the plates 15A and 15B.

It should be noted that the small size of the antenna limits the capacitive effect existing between the turns; furthermore, the presence of the metal zone 16 constitutes a load impedance for the antenna, which results in an increase in the resonance frequency to be produced. For this reason it has proven to be advantageous to add an additional capacitance, connected in parallel with the terminals of the antenna; this is one of the reasons for the formation of the capacitor 15. The manner in which such an additional capacitance is inserted is an important parameter in the correct functioning of the transponder; it must simultaneously satisfy the following conditions:

- an ability to control the geometry in accordance with the value to be obtained;
- ease of implementation, in a robust manner (transponders, for example within security documents, must pass strict flexing and twisting tests; the mounting of surface capacitors, although they easily allow the obtained capacitance to be adjusted, often entails flip-chip assembly, which creates substantial mechanical risk;
- a simple geometry suitable for low-cost industrial production; advantageously, the plates take a circular, oval or simple polygonal form, such as a square or rectangular form.

The invention implements etching or screen-printing techniques that are conventional in the field of printed circuit boards, and it would not appear to be useful to describe them here.

The capacitor 15 is thus formed on the carrier 12A bearing the antenna; this carrier is indeed produced conventionally from a dielectric material; as for the metal plates forming the capacitor, they are, for example, based on copper; it may also be a zone formed by a conductive ink deposited by any appropriate known means.

The capacitance of the capacitor may be defined by the following equation:

$$C_{ppl} = \frac{\varepsilon A}{t} \qquad \text{Eqn. (2)}$$

Where $\varepsilon$ is the product of the electrical permittivity of air and the dielectric permittivity of the carrier, A is the area of the metal plates 15A and 15B (assumed to be identical and facing one another) and t is the thickness of the dielectric material between these plates. If the plates are not identical or facing one another, it is in principle the area of the zones which are facing one another that must be used in the formula Eqn. (2) above).

The features of this capacitor, in particular the dimensions of its plates 15A and 15B, are chosen so that the capacitor defines, along with the antenna and the microcircuit, a given resonance frequency, chosen by the designer according to the requirements. One parameter is the thickness of the dielectric, which must confer sufficient rigidity on the module to allow handling without risk of damage; a range of 75 to 100 microns seems adequate.

It is apparently adequate for the plates 15A and 15B to have an area corresponding to between 60% and 90% of the area surrounded by the turns of the antenna.

The two plates actually have a maximum area that is smaller than the area surrounded by the turns, so as to keep a non-zero distance from the turns of the antenna; preferably, this non-zero distance is greater than the distance separating the turns from one another, preferably at least equal to 150% of this distance of separation. In order to ensure a good electrical connection between the capacitor, the microcircuit and the terminals of the antenna, these terminals are electrically and physically connected to each plate 15A or 15B, either directly or by means of vias denoted by P1 and P2 in FIG. 3.

The zone 16 is annular in the sense that it continuously extends around the cavity; however, it is in practice not circular. Specifically, the cavity into which the module is inserted conventionally has a rectangular form and, in order to be in proximity to the antenna, the inner contour of this zone 16 takes a form that closely follows the contour of this cavity.

The proximity between the inner contour of the zone 16 and the antenna means that this contour is advantageously located, with respect to the outer turn of the antenna, at a distance not exceeding five times the distance between this outer turn and the contour of its carrier.

Advantageously, in particular with a module the format of which is equal to a quarter, or even a fifth, of the ID-1 format, or even less, the inner contour of the zone 16 is at most 1 mm away from the antenna, or even at most 0.5 mm.

As for the outer contour of the zone 16, it may be defined only by the outer contour of the carrier; however, it may be chosen for this contour to be located a substantial distance away from the contour of the carrier when the area of this carrier is particularly large with respect to that of the module; specifically, it is possible not to have any substantial increase in the concentration of the flux lines when, for example, the area of the zone 16 exceeds 10 or even 20 times that of the carrier of the module. However, it may present advantages of another nature; by way of example, the metal zone may follow the outer edge of a page in the case of a passport. A portion of such a contour is denoted by the reference 18.

In contrast, it seems recommendable for the value of the area of this zone 16 to be at least three times that of the module carrier, in order to obtain a good effect of concentrating the flux lines toward the interior of this zone.

This zone may be solid, like the plates 15A and 15B of the capacitor; it is sufficient however, for cost reduction reasons in particular, for this zone to be apertured, having, for example, the form of a square, rectangular or even hexagonal mesh grid; in order to ensure that this zone is able to carry out its role of concentrating the flux lines toward the interior of the antenna, it seems advantageous for the width of the metalized strips separating non-metalized spaces to be between 0.3 and 1 times the width of the metalized spaces (it may also be said that the non-metalized spaces are advantageously of the order of two or even three times wider than the metalized lines of the grating—this relationship in fact depends on the conductivity of the tracks of the zone (material and thickness).

Such an apertured area may be deposited by screen printing; in a variant, it may be a layer of aluminum on metal which is subsequently etched.

A paradox appears to occur on examining a transponder according to the invention, when the large area covered by metal material, in particular for the capacitor, with respect to the dimensions of the antenna and to those of the metal concentration zone 16 is considered. It would have been expected, due to the flux line concentration effect produced by the zone 16, for the lines to tend to pass through the volume of the antenna but to be blocked by the plates forming the capacitor. In actuality, there is a near-continuity of the metal material across an area widely spilling over the cross section of the module, this continuity being broken only when facing the turns, by a slit forming a kind of footprint of the turns of this antenna.

In fact it appears best to position the plates of the capacitor as centrally as possible within the turns, the gap between the edge of a capacitor plate and the innermost track of the antenna being larger than the spacing of these turns. Thus, the field lines converge toward the center of the antenna due to the zone 16 while diverging due to the plate 15A or 15B and pass through the interstice between these plates 16 and 15A (or 15B).

Figure 3:
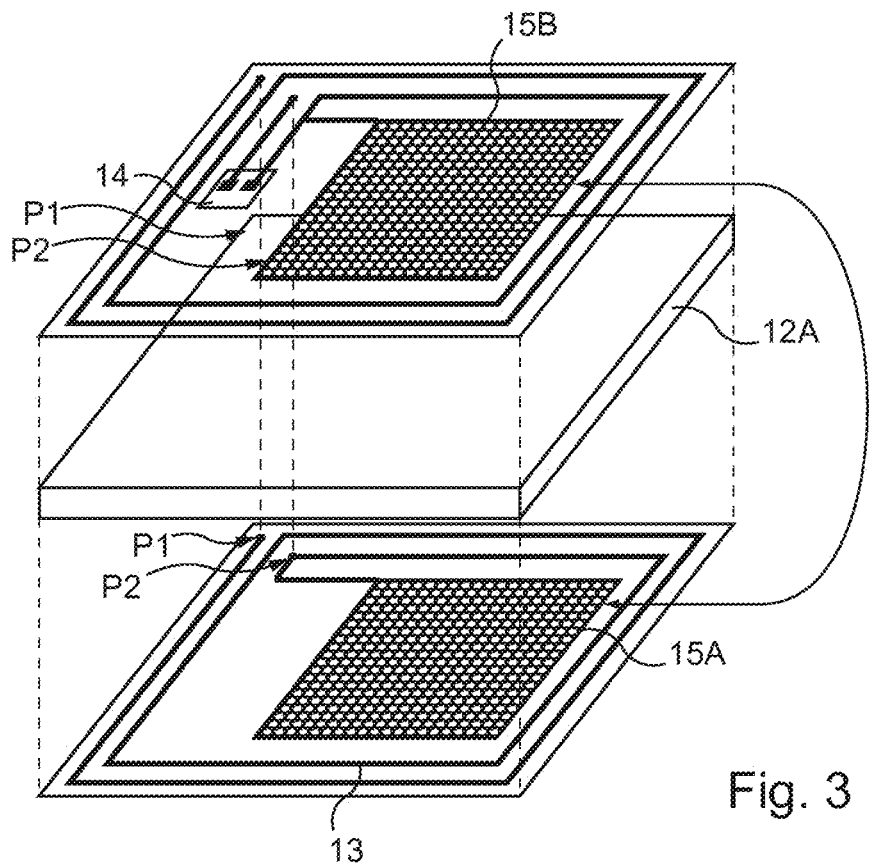
FIG. 3 is an exploded view of this transponder of FIG. 1.

In the example of FIG. 3, the antenna comprises turns positioned on each of the sides of the carrier 12A (while being connected by the vias P1), but it should be understood that the antenna may, in a variant, be formed on one and the same single side.

It is understood that it is advantageous for the direction of winding of the turns on the two sides of the carrier, connected by vias such as P1 or P2, to be such that there is a continuity in the loops formed by these turns. However, the direction of the current is of no particular importance per se.

FIG. 4 shows the side of the carrier 12A bearing the microcircuit 14; it should be noted that the presence of this microcircuit is compatible with the formation of a capacitor plate 15B covering an entirely substantial fraction of the area delimited by the turns of the antenna; specifically, the footprint of the microcircuit may be only small (typically of the order of 2 to 5 mm$^2$) with respect to the area surrounded by the antenna.

It is recalled that the invention is most particularly advantageous when the format of the carrier is at most equal to a quarter, or even a fifth, of the standardized ID-1 format; even in such a case, the area of a microcircuit may represent only a small fraction of that of the carrier.

In practice it is advantageous, at least for cost reasons, to use microcircuits of small size, even in combination with bodies of large size such as those of a form of identification such as a passport.

It is possible to envisage the body itself also comprising an antenna which is inductively coupled to the antenna of the module, but the invention provides a good cost-performance ratio without requiring such an antenna of large size.

FIGS. 5A to 5C show three phases of the insertion of a module such as that of FIG. 3 into a passport according to a first embodiment. The module 12, comprising antenna turns and capacitor plates on each of its sides (FIG. 5A), is inserted into a cavity of the body denoted by 111, which comprises, on its upper side, a metal annular zone 116 forming a flux line concentrator. Once the module is in place within the cavity (FIG. 5B), the upper plate 15A of the capacitor is substantially coplanar with the annular zone 116. The body may then be sandwiched between the two layers of a passport (for example between the flyleaf and the cover of a passport or else inserted between two layers forming a sheet made of rigid plastic in the passport).

FIGS. 6A to 6C differ from FIGS. 5A to 5C in that the module, denoted by 12', is inserted into the cavity of a body 211 that bears an annular zone 216 forming a flux line concentrator on its lower side; thus the zone 216 is not coplanar with any of the capacitor plates. However, it is apparent that at the scale of the thickness of the module, a slight offset between the levels of the metal layers is not disruptive. It is apparent that, perpendicularly to the sides of the carrier, an offset of up to the order of half a millimeter can be tolerated without substantially decreasing the flux line concentration effect.

The technique described in these FIGS. 5A-C and 6A-C is per se close to the technique known as the "flip-chip" technique; once the module is ready to be put into place by means of previously deposited bumps of adhesive, a resin is advantageously injected between these bumps, thereby allowing a contact zone that is substantially planar with the carrier to be obtained.

In actuality, it is not necessary for the outer metal zone to be coplanar with either of the plates of the capacitor.

The carrier may be made of silicon.

By way of example, the present invention is particularly applicable to a passport that comprises an electronic entity comprising a transponder fixed to a first layer by means of an adhesive or by lamination and a metal zone produced on a second layer that is separate from the first layer. The first and second are then advantageously assembled with the layer forming the cover and the flyleaf, between which the electronic entity is held.

The dimensions of such a passport will preferably satisfy the regulations specified in the standard ICAO 9303 and the standards ISO/IEC 7810 for the ID-3 format (apart from the thickness), namely 88 mm*125 mm.

According to one preferred embodiment, the dimensions of the grating are substantially equal to that of a passport page and the dimensions of the transponder are equal to roughly 3% of the maximum area of the grating.

The invention claimed is:

1. An electronic entity comprising a transponder, which entity is intended to communicate with an external reader at a first determined frequency and comprises a body (11) provided with a cavity and, in this cavity, a transponder comprising a carrier having a plane and (12A) bearing, connected to one another, an antenna (13) formed from at least one turn following the contour of the carrier and a microcircuit (14), plates made of a conductive material (15A, 15B) being formed on each of these sides facing one another so as to form a capacitor connected in parallel with the antenna, and the body comprising, at least approximately at the level of this cavity, an annular metal zone (16) having an inner contour, the projection of which into the plane of the carrier surrounds said carrier and which is capable of concentrating field lines toward the interior of the turn, the capacitor defining, with the antenna and the microcircuit, a resonant circuit resonating at a second frequency that is substantially equal to the first frequency, the plates of the capacitor (15A, 15B) covering 60% to 90% of the surface delimited by the one or more turns of the antenna.

2. The electronic entity as claimed in claim 1, in which the area of the metal zone (16) is at least equal to three times that of the carrier (12A).

3. The electronic entity as claimed in claim 2, in which the metal zone (16) surrounding the antenna is apertured.

4. The electronic entity as claimed in claim 2, in which the antenna (13) comprises at least one turn on each of the sides of the carrier.

5. The electronic entity as claimed in claim 2, in which the transponder comprises at least two turns spaced apart by a spacing and the plates of the capacitor have an edge adjacent to the innermost turn, this edge being distanced from the innermost turn by a distance that is greater than the spacing between the turns.

6. The electronic entity as claimed in claim 2, the capacitor plates of which are rectangular or circular.

7. The electronic entity as claimed in claim 1, in which the metal zone (16) surrounding the antenna is apertured.

8. The electronic entity as claimed in claim 7, in which the antenna (13) comprises at least one turn on each of the sides of the carrier.

9. The electronic entity as claimed in claim 7, in which the transponder comprises at least two turns spaced apart by a spacing and the plates of the capacitor have an edge adjacent to the innermost turn, this edge being distanced from the innermost turn by a distance that is greater than the spacing between the turns.

10. The electronic entity as claimed in claim 7, the capacitor plates of which are rectangular or circular.

11. The electronic entity as claimed in claim 1, in which the antenna (13) comprises at least one turn on each of the sides of the carrier.

12. The electronic entity as claimed in claim 11, the antenna of which comprises between two and five turns per side.

13. The electronic entity as claimed in claim 12, in which the transponder comprises at least two turns spaced apart by a spacing and the plates of the capacitor have an edge adjacent to the innermost turn, this edge being distanced from the innermost turn by a distance that is greater than the spacing between the turns.

14. The electronic entity as claimed in claim 11, in which the transponder comprises at least two turns spaced apart by a spacing and the plates of the capacitor have an edge adjacent to the innermost turn, this edge being distanced from the innermost turn by a distance that is greater than the spacing between the turns.

15. The electronic entity as claimed in claim 11, the capacitor plates of which are rectangular or circular.

16. The electronic entity as claimed in claim 1, in which the transponder comprises at least two turns spaced apart by a spacing and the plates of the capacitor have an edge adjacent to the innermost turn, this edge being distanced from the innermost turn by a distance that is greater than the spacing between the turns.

17. The electronic entity as claimed in claim 1, the capacitor plates of which are rectangular or circular.

18. The electronic entity as claimed in claim 1, the transponder of which has a format that is at most equal to quarter of the standardized format ID-1.

19. The electronic entity as claimed in claim 1, the body and the module of which form a data storage card or a form of identification.

20. A passport comprising at least one cover page, one flyleaf, one page made of plastic and one page made of bank book paper, characterized in that it additionally comprises an electronic entity as claimed in claim 1, the body of which has at most the dimensions of a page of said passport, the body being assembled with said page among a cover page, the flyleaf and the page made of plastic.

* * * * *